R. H. KLEISER.
WEIGHING MACHINE.
APPLICATION FILED NOV. 15, 1915.
1,186,406.
Patented June 6, 1916.
2 SHEETS—SHEET 2.
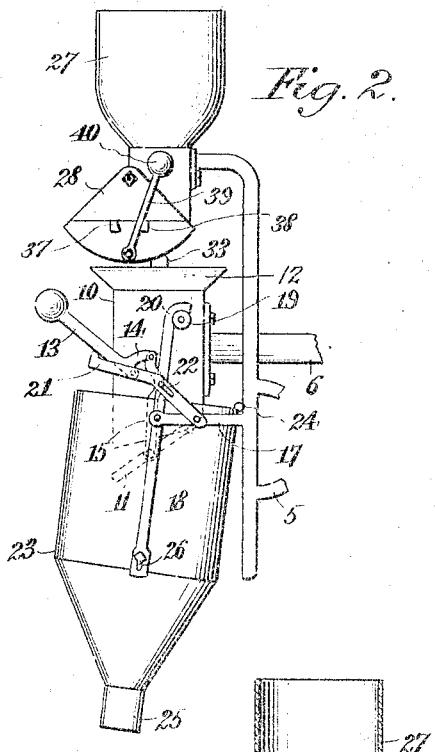
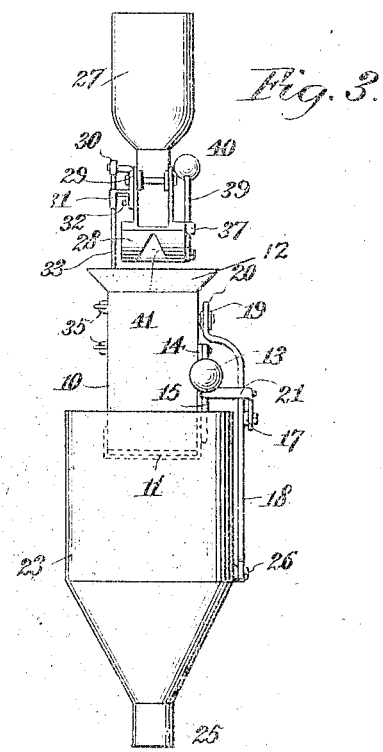
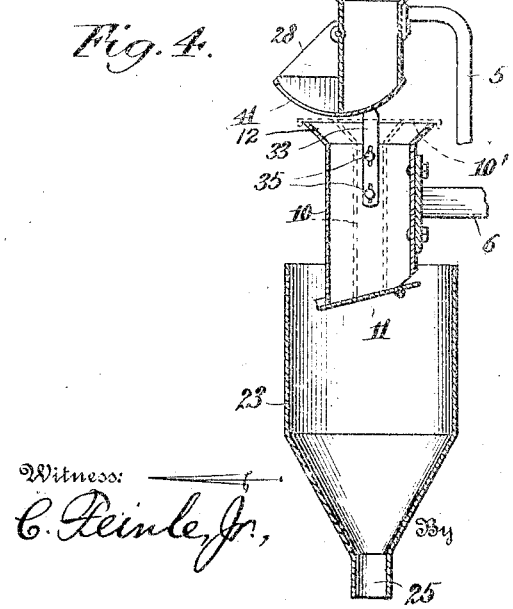
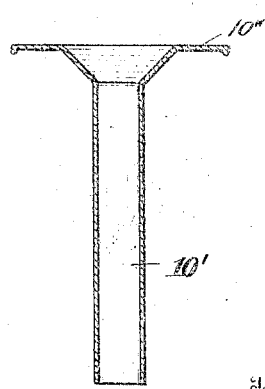
Witness:
C. Peinle, Jr.
Inventor,
Robert H. Kleiser,
By Victor J. Evans,
Attorney

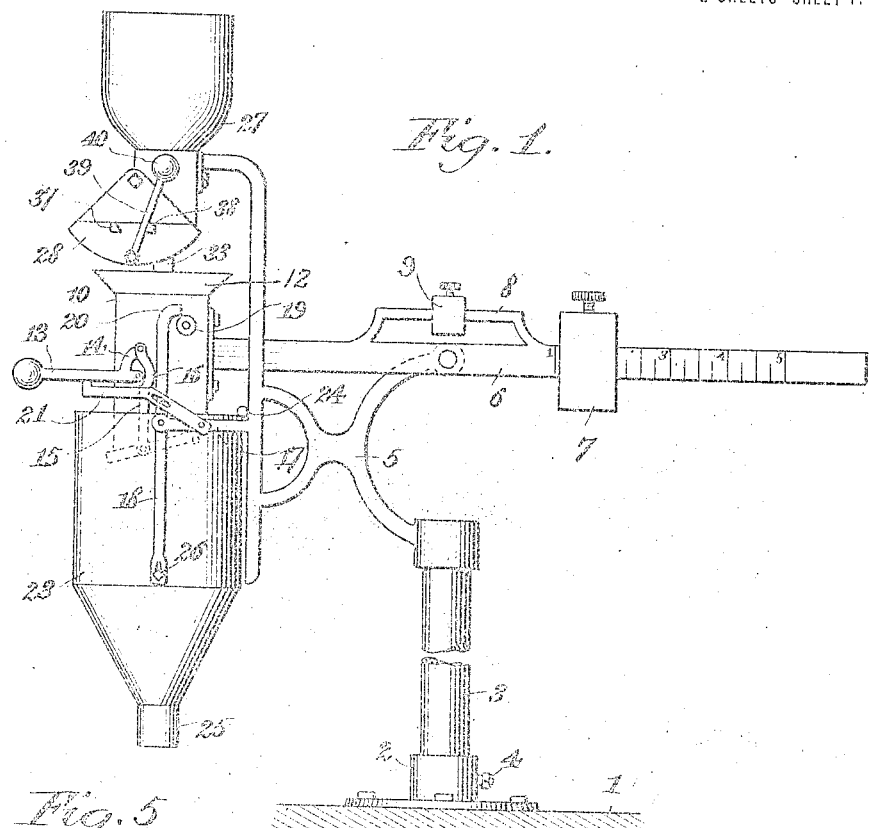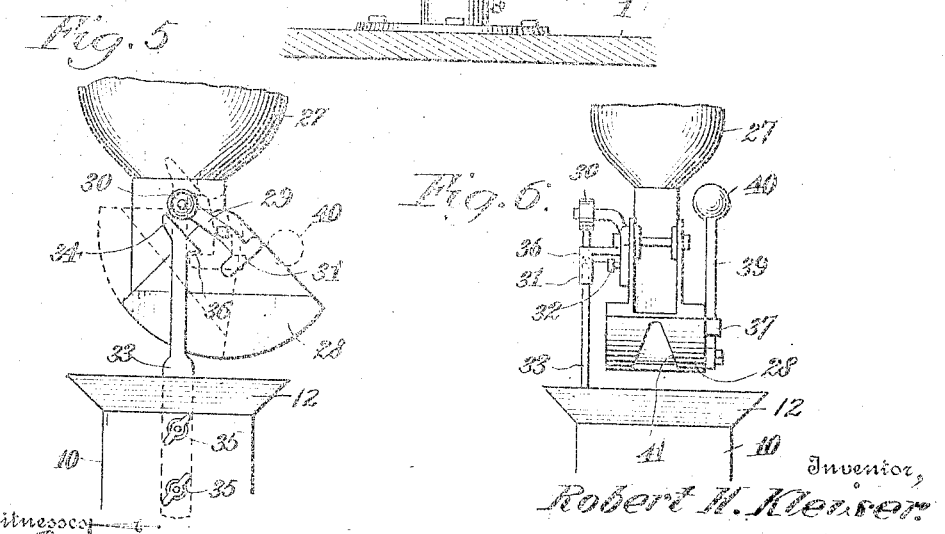

UNITED STATES PATENT OFFICE.

ROBERT H. KLEISER, OF DE WITT, ARKANSAS.

WEIGHING-MACHINE.

1,186,406. Specification of Letters Patent. Patented June 6, 1916.

Application filed November 15, 1915. Serial No. 61,676.

*To all whom it may concern:*

Be it known that I, ROBERT H. KLEISER, a citizen of the United States, residing at De Witt, in the county of Arkansas and State of Arkansas, have invented new and useful Improvements in Weighing-Machines, of which the following is a specification.

This invention relates to weighing machines and it consists in the novel features hereinafter described and claimed.

An object of the invention is to provide a machine of the character stated especially adapted to be used for weighing commodities such as for instance, rice, or other similar granular materials, and which includes a weighing hopper mounted upon a beam which in turn is pivotally mounted upon a frame and which is provided with a weight adjustably mounted thereon. A closure is provided for the discharge end of the weighing hopper and a filling hopper is pivotally connected with the frame and receives the lower end portion of the said weighing hopper. The filling hopper is adapted to be tilted or swung upon its pivot when the contents of the weighing hopper are emptied into the filling hopper and the material which falls from the weighing hopper into the filling hopper may gravitate into a bag or other receptacle provided at the discharge end of the filling hopper for the reception of the material. Means are provided for opening the discharge valve of the weighing hopper when the filling hopper is tilted as above indicated. A feeding hopper is mounted upon the frame above the weighing hopper and a valve is pivotally mounted upon the same and normally closes the discharge outlet thereof. Means are provided upon the weighing hopper and the valve of the feeding hopper for closing the valve of the feeding hopper when the weighing hopper moves away from the same and for opening the valve of the feeding hopper when the weighing hopper moves toward the same and is in position to receive the commodity from the feeding hopper.

In the accompanying drawings:—Figure 1 is a side elevation of the weighing machine showing the parts in their relative position when the weighing hopper is in a position to receive the commodity from the feeding hopper. Fig. 2 is a similar view of the machine showing the relative positions of the parts when the filling hopper has been tilted or swung upon its pivotal connection with the frame and the operating mechanism for the valve of the weighing hopper has been moved to permit the material to gravitate from the weighing hopper into the filling hopper. Fig. 3 is a similar view looking at the machine at a right angle from the view shown in Fig. 2 and showing the parts in different positions. Fig. 4 is a vertical sectional view of the weighing machine. Fig. 5 is a detail side elevation of the intermediate parts of the weighing machine. Fig. 6 is a similar view looking at the same at a right angle to the view shown in Fig. 5. Fig. 7 is a vertical sectional view of an attachment which may be applied to the hopper of the weighing machine.

The weighing machine comprises a base 1 which may be positioned upon a floor or other suitable support. The said base 1 is provided at its center with a collar 2 which slidably receives the lower end portion of a standard 3. A set screw 4 is mounted upon the collar 2 and at its inner end is engageable with the standard 3 to hold the same at an adjusted position with relation to the base 1. A frame 5 is mounted at the upper end of the standard 3 and by loosening the set screw 4 the said frame may be swung around the axis of the standard 3 and positioned at any desired side of the axis of the said standard.

A beam 6 is pivotally mounted upon the frame 5 and a weight 7 is slidably mounted upon the said beam. A bar 8 is mounted upon the beam 6 above the point of pivotal connection between the said beam and the frame 5 and a counter weight 9 is slidably mounted upon the said bar 8. A weighing hopper 10 is fixed to one end of the beam 6 and is provided at its lower end with a pivoted valve 11. The upper end of the weighing hopper 10 is flared or funnel-shaped as at 12. A weighted lever 13 is pivotally connected at one end to the side of the weighing hopper 10 and the said lever 13 is provided at a point between its free end and the point of pivotal connection with the hopper 10 with an upstanding arm 14. A bar 15 is pivotally connected at its upper end with the upper portion of the arm 14 and the said bar 15 is pivotally connected at its lower end with the valve 11 at a point between the point of pivotal connection of the valve with the hopper 10 and the free edge of the said valve. The bar 15 is provided at a point between its ends with an offset or bowed portion 16 which at times may receive the pivoted end of the lever 13 whereby the point of pivotal connection between the bar 15 and the arm 14 may be positioned at one side of a line extending through the point of pivotal connection between the bar 15 of the valve 11 and the point of pivotal connection between the lever 13 and the hopper 10. For instance when the point of pivotal connection between the bar 15 and the arm 14 is in advance of the line which extends through the pivot between the bar 15 and the valve 11 and the lever 13 and the hopper 10 the said valve 11 is held in closed position against the lower end of the weighing hopper 10. When however, the point of pivotal connection between the bar 15 and the arm 14 is moved toward the opposite side of the said line the free edge of the valve 11 may gravitate in a downward direction thereby uncovering the lower end of the weighing hopper 10 and permitting the contents thereof to gravitate therefrom.

An arm 17 is fixedly attached to the frame 5 and a lever 18 is fulcrumed at a point between its ends to the end portion of the arm 17. A roller 19 is journaled at the side of the weighing hopper 10 and the lever 18 is provided at its upper end with a hook 20 adapted at times to engage over the roller 19 as hereinafter explained. A bar 21 is fixed to the bar 15 and pin and slot connection 22 is provided between the bar 21 and the lever 18. A filling hopper 23 is pivotally or hingedly connected with the frame 5 at a point 24 and the upper portion of the filling hopper 23 receives the lower part of the weighing hopper 10 and the valve 11 which is attached to the lower end thereof. The filling hopper 23 is provided at its lower end with a discharge nozzle 25 around which a bag or other container may be placed and through which the material may be fed from the filling hopper 23 into the said container. A pin and slot connection 26 is provided between the lower end of the lever 18 and the side of the filling hopper 23. A feeding hopper 27 is mounted upon the frame 5 at a point above the weighing hopper 10 and a valve 28 is pivotally mounted at the side of the hopper 27 and at times is adapted to close the lower outlet end thereof.

An arm 29 is turnably mounted upon the pivot of the valve 28 and the said arm is provided at its upper end with a roller 30. The arm 29 is provided at its lower end with an offset extremity 31. A set screw 32 is provided at the lower portion of the arm 29 and is engageable with the side of the valve 28 and may be used for positioning the arm 29 at a desired position with relation to the pivot of the said valve. A bar 33 is adjustably secured at the side of the weighing hopper 10 and the said bar is provided at its upper end with a cam surface 34 adapted to engage the roller 30 and swing the arm 29 whereby the valve 28 is moved to an open position at the lower end of the hopper 27 when the hopper 10 moves to an elevated position. The adjusting means for securing the arms 33 to the hopper 10 may consist of bolt and slot devices 35 or any other suitable securing means may be provided for holding the bar 33 at an adjusted position upon the hopper 10. When the hopper 10 swings in a downward direction, a lug 36 which is carried at the upper end of the bar 33 below the cam surface 34 engages the offset extremity 31 of the arm 29 and the said arm is swung whereby the valve 28 is moved to a closed position below the feeding hopper 27. The valve 28 may be provided at that side opposite the side thereof at which the arm 29 is mounted with outstanding spaced lugs 37 and 38 and a rod 39 is pivoted to the valve 28 at a point between and below the lugs 37 and 38. The intermediate portion of the rod 39 lies between the said lugs and a weight 40 is mounted upon the upper portion of the rod. When the valve 28 moves to an open position the rod 39 is swung by gravity into engagement with the lug 38 whereby the valve is temporarily held in an open position and when the valve 28 is swung to a closed position the rod 39 is held by gravity in contact with the lug 37 so that the said valve 28 is temporarily held closed at the lower end of the hopper 27. By providing the rod 39 and weight 40 adjustably mounted thereon the said valve 28 is caused to move promptly from a closed to an open position and vice versa. The valve 28 is provided at its bottom with a V-shaped opening 41 which is adapted to move under the lower end of the hopper 27 when the valve 28 is swung to an open position and through which the material which is contained in the hopper 27 gravitates therefrom into the hopper 10.

The operation of the weighing machine is as follows:—Assuming that a sufficient quantity of the commodity to be weighed has been deposited in the hopper 27 and the weight 7 has been positioned upon the beam 6 to swing the beam whereby the weighing hopper 10 is moved to its elevated position. The weighing hopper while at its elevated position moves the bar 33 whereby the cam surface 34 thereof engages the roller 30 and swings the arm 29 which in turn moves the valve 28 to an open position. Consequently the material may gravitate from the hopper 27 into the hopper 10. When a sufficient quantity of the material has accumulated in the hopper 10 to counterbalance the weight 7 the hopper 10 descends by gravity and hence the lug 36 at the upper portion of the bar 33 encounters the offset extremity 31 of the arm 29 and swings the valve 28 from an open to a closed position whereby the flow of material from the hopper 27 into the hopper 10 is interrupted.

An operator then places a bag or other receptacle about the nozzle 25 of the hopper 23 and swings the lower end of the hopper 23 in a forward direction on the pivot 24 between the said hopper and the frame 5. During the forward swinging movement of the lower portion of the hopper 23 the lever is swung whereby the hook 20 is carried over the roller 19 and at the same time the pin and slot connection 22 between the lever 18 and the bar 21 swings the said bar which in turn swings the bar 15 so that the point of pivotal connection between the bar 15 and the arm 14 is carried behind a line between the point of pivotal connection of the bar 15 and the valve 11 and the lever 13. and the side of the hopper 10. The free edge of the valve 11 is relieved of its support and under the weight of the material in the hopper 10 the valve 11 swings to an open position and the material may gravitate from the hopper 10 into the hopper 23 and through the nozzle 25 thereof into the bag or other receptacle which is applied to the said nozzle. Thus it will be seen that the material is weighed in predetermined quantities and each quantity is deposited within a single bag or receptacle. After depositing one quantity of the weighed material in a bag or receptacle the lower portion of the hopper 23 is released whereby it assumes a vertical position under the influence of gravity and the lever 18 is moved to release the roller 19 whereby the weight 7 causes the weighing hopper 10 to move in an upward direction and the connecting parts between the valve 11 and the arm 7 cause the said valve to move to a closed position and the valve is locked in a closed position in view of the fact that the point of pivotal connection between the bar 15 and the arm 14 is moved to a point in advance of the line which passes through the point of pivotal connection between the bar 15 and the valve 11 and the lever 13 and the hopper 10.

When the hopper 10 moves from a lower to an upper position as just described the cam surface 34 carried at the upper portion of the bar 33 encounters the roller 30 upon the arm 29 whereby the valve 28 is moved from a closed to an open position and a certain quantity of material may gravitate from the hopper 27 into the hopper 10.

Sometimes in weighing small quantities of material it is desirable to use a false hopper in the hopper 10, the said false hopper being less in transverse sectional area than the transverse sectional area of the hopper 10. In this instance a hopper 10' is inserted in the hopper 10 and is held therein by means of a flange 10'' which is mounted at the upper end of the hopper 10' and adapted to lie over the upper edge of the hopper 10. By providing such a small hopper and using the same when small amounts of the material are weighed the quantity of material in the small hopper is maintained therein in a long and slim column or volume and hence it will gravitate more readily through the small hopper when the valve 11 is moved from under the hopper 10 and thus it will pass more directly through the filling hopper and into the package and the material will not have a tendency to dribble and a more accurate weight of the small quantities may be had. When the false hopper is used small amounts of material may be accurately weighed because the material on the way, frequently called the "column of material in the air" is cut off with each weighing and the columns of material are maintained at uniform minimum length.

Therefore, it will be seen that a weighing machine is provided and that the machine will automatically weigh the material and separate it into predetermined quantities. However, the machine does not automatically empty itself but whenever an operator applies a receptacle to the filling hopper of the machine and subjects the filling hopper to the manipulation described the predetermined quantity of material which has been weighed is permitted to pass under the influence of gravity from the machine into the receptacle or container.

Having described the invention what is claimed is:—

1. A weighing machine comprising a balanced beam, a weighing hopper carried by the beam, a valve for closing the discharge outlet of the weighing hopper, a filling hopper mounted for movement with relation to the weighing hopper, means operable by the movement of the filling hopper for moving the valve with relation to the weighing hopper, a hopper located above the weighing hopper, a valve for controlling the discharge outlet of the last mentioned hopper and means carried by the weighing hopper for moving the valve of the last mentioned hopper.

2. A weighing machine comprising a balanced beam, a weighing hopper carried by the beam, a valve pivotally mounted at the discharge outlet of the weighing hopper, a filling hopper pivotally mounted for swinging movement with relation to the weighing hopper, means adapted to be operated in consequence of the swinging movement of the filling hopper, for moving the valve with relation to the weighing hopper, a feeding hopper located above the weighing hopper, a valve mounted for movement at the discharge outlet of the feeding hopper and means carried by the weighing hopper for moving the valve upon the feeding hopper.

3. A weighing machine comprising a balanced beam, a weighing hopper carried by the beam, a valve mounted for movement at the discharge outlet of the weighing hopper, a filling hopper mounted for pivotal movement with relation to the weighing hopper, a weighted lever mounted upon the weighing hopper and having an upstanding arm, a bar connecting said arm with the valve of the weighing hopper and having an offset portion adapted at times to receive the pivoted end portion of the said lever, a second lever fulcrumed at the side of the filling hopper there being pin and slot connections between one end portion of the second mentioned lever and the said filling hopper, an outstanding part carried by the weighing hopper, the second mentioned lever having a hook adapted to engage over said outstanding part, a bar pivotally mounted adjacent the hoppers and connected with the first mentioned bar, there being pin and slot connections between the second mentioned bar and the second mentioned lever, a feeding hopper mounted above the weighing hopper, a valve movably mounted at the discharge outlet of the feeding hopper and means carried by the weighing hopper for moving the valve of the feeding hopper.

4. A weighing machine comprising a balanced beam, a hopper carried thereby, a valve mounted for pivotal movement at the discharge outlet of the weighing hopper, a filling hopper pivotally mounted below the weighing hopper, a weighted lever fulcrumed upon the weighing hopper, a bar pivotally connected with the weighing hopper, and pivotally connected with the valve and having an offset portion adapted at times to receive the pivoted end of the said lever, a second lever fulcrumed adjacent the hoppers, there being pin and slot connections provided between the second mentioned lever and filling hopper, an offset part carried by the weighing hopper, there being a hook provided upon the second mentioned lever adapted to engage over said offset part at times, a bar pivoted adjacent the hoppers and connected with the first mentioned bar, there being pin and slot connections between the second mentioned bar of the second mentioned lever and means for feeding material to the weighing hopper.

5. A weighing machine comprising a balanced beam, a weighing hopper carried by the beam, a valve pivotally mounted at the discharge outlet of the weighing hopper, a filling hopper pivotally mounted with relation to the weighing hopper, means operable in consequence of the swinging movement of the filling hopper for moving the valve with relation to the discharge outlet of the weighing hopper, a feeding hopper mounted above the weighing hopper, a valve for controlling the outlet of the feeding hopper, an arm fixed to the pivot of the last mentioned valve, a bar carried by the weighing hopper and having an end portion engageable with said arm to move the valve of the feeding hopper in consequence of the movement of the weighing hopper.

6. A weighing machine comprising a balanced beam, a weighing hopper carried thereby, a valve movably mounted at the discharge outlet of the weighing hopper, a filling hopper movably mounted with relation to the weighing hopper, means operable in consequence of the movement of the filling hopper with relation to the weighing hopper for moving the valve at a discharge outlet of the weighing hopper, a feeding hopper located above the weighing hopper, a valve pivotally mounted upon the feeding hopper, and adapted to control the discharge thereof, an arm adjustably mounted upon the pivot of the valve of the feeding hopper, means for securing said arm at an adjusted position with relation to the valve of the feeding hopper, and a bar carried by the weighing hopper and engageable with the said arm to swing the valve of the feeding hopper in consequence of the movement of the weighing hopper.

7. A weighing machine comprising a balanced beam, a weighing hopper carried by the beam, a valve mounted for movement at the discharge outlet of the weighing hopper, a filling hopper movably mounted with relation to the weighing hopper, means operable in consequence of the movement of the filling hopper with relation to the weighing hopper for moving the valve at the discharge outlet of the weighing hopper, a false hopper insertible in the weighing hopper for diminishing the transverse sectional area thereof, a feeding hopper located above the weighing hopper, a valve movably mounted upon the feeding hopper and means carried by the weighing hopper for moving the valve upon the feeding hopper in consequence of the movement of the weighing hopper.

In testimony whereof I affix my signature in presence of two witnesses.

ROBERT H. KLEISER.

Witnesses:
C. W. HARSHBARGER,
CHAS. H. KLEISER.